Aug. 4, 1970  R. A. SPYRA  3,522,976
SELF-ALIGNING BEARING UNIT
Filed Oct. 8, 1968
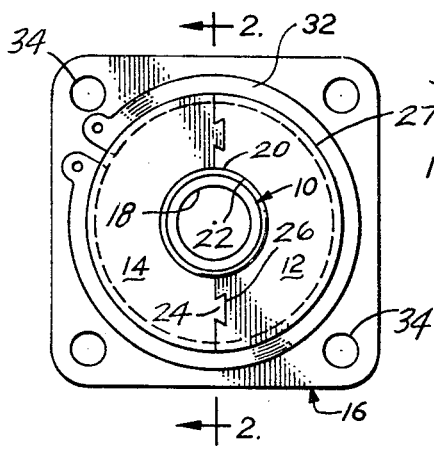
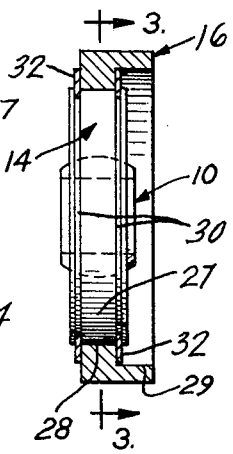
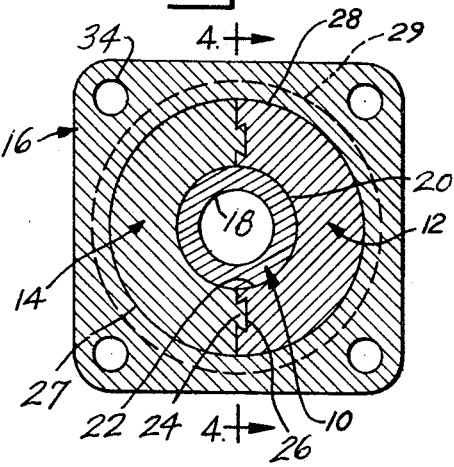
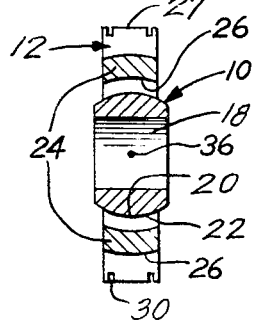
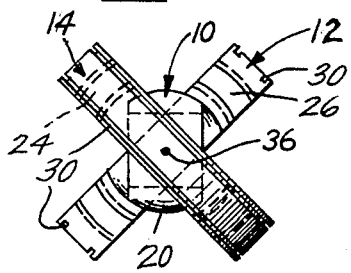
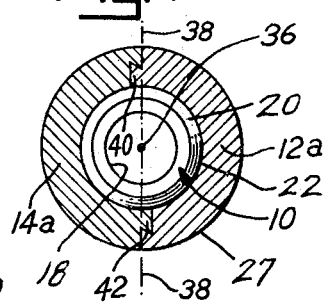
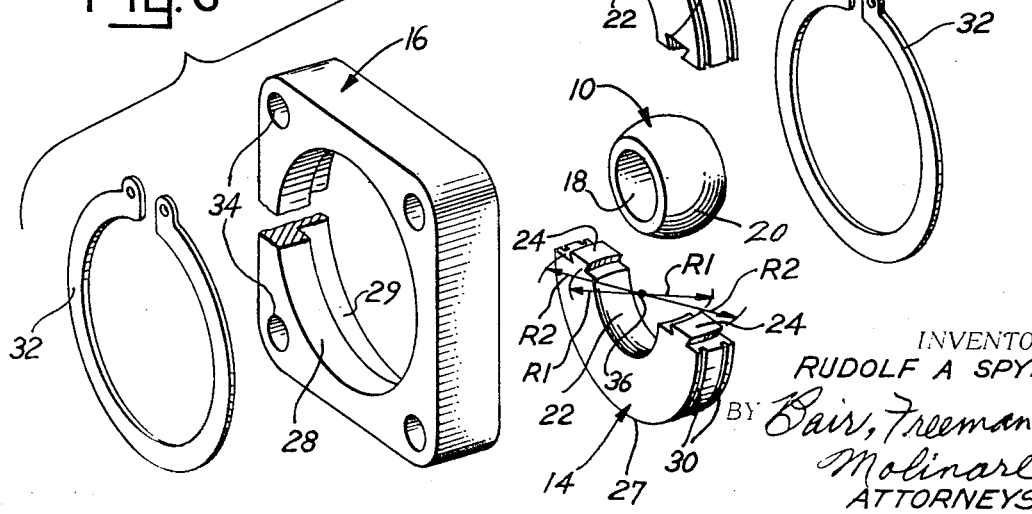
INVENTOR.
RUDOLF A SPYRA
BY Bair, Freeman & Molinare
ATTORNEYS United States Patent Office 3,522,976
Patented Aug. 4, 1970

3,522,976
SELF-ALIGNING BEARING UNIT
Rudolf A. Spyra, 5344 N. Paulina, Chicago, Ill. 60640
Filed Oct. 8, 1968, Ser. No. 765,865
Int. Cl. F16c 9/06, 23/00
U.S. Cl. 308—72                                6 Claims

ABSTRACT OF THE DISCLOSURE

A self-aligning bearing unit comprising a bearing member held in a two-part bearing receiving member, the two members having mating spherical surfaces for self-aligning purposes, and the two parts of the bearing receving member being assembled by means of dove tail joints which are generated about the center point of the sphere. The two-part bearing member may then be mounted in a frame and held therein by suitable means such as C-ring retainers. Assembly of the two parts of the bearing receiving member involves simply the co-action of their spherical surfaces with the spherical surface of the bearing member while the two parts are out of alignment, and then rotation into alignment whereupon the dove tail connections coact with each other to prevent subsequent spreading apart of the two parts of the bearing member relative to each other.

BACKGROUND OF THE INVENTION

Heretofore self-aligning bearings have been provided in the form of bearing members having spherical surfaces mounted in bearing receiving members of one form or another; some of these bearing receiving members being of unitary construction and the bearing swaged therein while others are of two-part construction but require additional means such as bolts, screws or the like for holding the two parts of the bearing receiving member together. By way of example, Riebe Pat. No. 2,047,885; Heim Pat. No. 2,400,506; McKloskey Pat. No. 3,365,249 and Kuhn Pat. No. 3,377,681 show some of the just mentioned possibilities. In those cases where the bearing receiving member is made in two parts however there is no simple way disclosed in the prior art for connecting the two parts together in the manner herein disclosed without the use of fastening elements other than those formed on such two parts.

One object of my present invention is to provide a self-aligning bearing comprising few and simple parts which are quickly and easily assembled relative to each other.

Another object is to provide a bearing member and a bearing receiving member in which the receiving member is formed in two parts having dove tail joints for connection with each other.

Still another object is to provide a special type of dove tail connection permitting rotation of one bearing receiving element relative to another one, the dove tail surfaces for this purpose being generated about the center point of a sphere, which sphere defines the outer surface of the bearing member and a bore formed in the two parts of the bearing receiving member.

A further object is to provide a simple means for locking the two parts of the bearing receiving member against disassembly by forming the outside thereof as a cylindrical surface and entering that surface into a bore of a bearing mounting member.

Still a further object is to retain the bearing receiving member in the bearing mounting member by the expedient of C-ring retainers in grooves in the periphery of the bearing receiving member and against opposite surfaces of the bearing mounting member.

BRIEF SUMMARY OF THE INVENTION

A bearing member having a spherical surface is seated in a mating spherical surface formed in the two parts of a two-part bearing receiving member, and the two parts are provided with dove tail connections with each other. The dove tail surfaces are generated about the center point of the sphere so that one part of the bearing receiving member may be positioned against the bearing member and out of alignment with the other part of the bearing receiving member, which other part is positioned against the opposite side of the bearing member. Then the two parts are rotated for aligning them during which process the dove tails coact with each other. The assembly of bearing member and bearing receiving member may then be mounted in a bearing mounting member and retained as by C-ring retainers in grooves of the bearing receiving member.

BRIEF DESCRIPTION OF THE DRAWING

FIG. 1 is a side elevation of a complete self-aligning bearing unit embodying my invention;

FIG. 2 is a vertical sectional view thereof on the line 2—2 of FIG. 1, a bearing receiving member however being shown in elevation;

FIG. 3 is a vertical sectional view on the line 3—3 of FIG. 2;

FIG. 4 is a vertical sectional view on the line 4—4 of FIG. 3, omitting a bearing mounting member shown in FIG. 3;

FIG. 5 is an elevation of the bearing receiving member and the bearing of my self-aligning bearing unit with two bearing receiving elements which constitute the bearing receiving member rotated to an initial position for assembly;

FIG. 6 is an exploded perspective view of the parts of my self-aligning bearing unit; and FIG. 7 is a sectional view of a modified form of bearing receiving member and bearing member received therein, the view being similar to that shown in part of FIG. 3.

DESCRIPTION OF THE PREFERRED EMBODIMENTS

My self-aligning bearing comprises primarily four parts, a bearing member 10, bearing receiving elements 12 and 14 and a bearing mounting member 16. The bearing member 10 is characterized by a bore 18 and a spherical outer surface 20. The bore 18 is shown as a smooth bore to receive a shaft although of course it may be bushed, or provided with ball or roller bearings in which case it would be suitably sized to receive such bearings.

The bearing receiving elements 12 and 14 together constitute a bearing receiving member characterized by an internal spherical bore 22 to fit the spherical surface 20 of the bearing member 10, male dove tail connections 24, female dove tail connections 26 and a peripheral surface 27.

The bearing mounting member 16 is in the form of a frame to receive the elements 10, 12 and 14 as will hereinafter appear and is characterized by a bore 28 to fit the peripheral surface 27 of the bearing receiving member 12, 14, a counterbore 29 and mounting holes 34. To retain the bearing receiving member 12, 14 in the bearing mounting frame 16, the bearing receiving member is provided with retainer grooves 30, and C-ring retainers are adapted for coaction therewith as shown particularly in FIGS. 1 and 2. While the surfaces 27 and 28 are shown as cylindrical, they may be of other geometrical shapes if desired.

An important characteristic of the dove tail connections 24 and 26 is that they are formed on radii such as illustrated in FIG. 6—R1 from a center point 36 indicated by a dot to the inner edges of the dove tail connection 24, and R2 to the outer edges thereof, the center point 36 being the one about which the spherical surface 20 and the spherical bore 22 are generated. Accordingly, the bearing receiving elements 12 and 14 may be positioned with respect to the bearing member 10 as shown in FIG. 5, and then rotated to aligned position as in FIG. 2 where the two elements 12 and 14 form a disc, the peripheral surface 27 of which will fit into the bore 28 of the member 16. Thereupon the C-ring retainers 32 may be manipulated to coact with the retainer grooves 30 as in FIGS. 1 and 2, and the parts are thereby easily and quickly assembled to form the completed self-aligning bearing unit illustrated in FIG. 1 suitable for mounting, for instance, by means of screws through the mounting holes 34 and into the housing of an electric motor, the armature shaft of which is journalled in two of the bearing members 10 at opposite ends of the housing. Subsequently the parts may be easily disassembled for replacement of worn bearing members 10 or other purposes.

In FIG. 7 a modification of my invention is illustrated wherein a single dove tail joint is provided above the bearing member 10 and a single one is provided therebelow instead of the double types shown in the previous figures. Such an arrangement as illustrated may be machined in accordance with proper rotation of the bearing receiving elements past a properly contoured milling cutter for generating the dove tail joints on radii from the center point 36, one joint projecting as at 40 from one side of the parting line 38 for the bearing receiving elements 12a and 14a, and the other joint projecting as at 42 from the opposite side of the parting line. While I have shown two male dove tail joints projecting from the element 14 in FIG. 6, and the female dove tail joints as formed in the element 12, one of the coacting joints 24, 26 may be reversed if found more suitable for machining or symmetry purposes without affecting the assembly procedure or the connecting capability between the two parts of the bearing receiving member.

From the foregoing specification it is obvious that a comparatively simple self-aligning bearing unit is provided involving but few parts and a relatively simple procedure for assembly and disassembly. Once assembled the parts of the unit when made in accordance with the disclosure provide a rugged, readily interchangeable unit for any type of machinery having a shaft which requires self-aligning bearings.

I claim as my invention:

1. In a self-aligning bearing unit, a bearing member having a spherical outer surface, a two-part bearing member having a spherical bore to receive said bearing member, a dove tail connection between said two parts wherein the dove tail surfaces thereof are generated on a radius from the center point of the spherical surface of said bearing, and a bearing mounting member receiving said bearing receiving member and retaining the two parts thereof in aligned position.

2. A bearing unit in accordance with claim 1 wherein said bearing mounting member has a bore receiving said bearing receiving member, said bearing receiving member having a cylindrical surface fitting said bore, and means at each end of said bore for retaining said two-part bearing receiveng member in said bore.

3. A bearing unit in accordance with claim 2 wherein said means for retaining comprises retainer grooves in opposite ends of said bearing mounting member, and retainer rings received therein and engaging the ends of the bore of said bearing mounting member.

4. A bearing unit in accordance with claim 1 wherein said dove tail connections comprise male dove tail projections from one of said bearing receiving members and female dove tail grooves in the other thereof.

5. A bearing unit in accordance with claim 1 wherein said dove tail connections comprise a single dove tail joint at one side of said bearing member and a single dove tail joint at the other side thereof.

6. A bearing unit in accordance with claim 5 wherein one of said joints has a projection in one direction from the parting line between said bearing receiving elements, and the other of said joints has a projection in the opposite direction from said parting line.

References Cited

UNITED STATES PATENTS

| 601,885 | 4/1898 | Coffin | 308—29 |
|---------|--------|--------|--------|
| 1,807,373 | 5/1931 | Blunt. | |
| 2,077,582 | 4/1937 | Peo | 287—72 X |
| 2,621,088 | 12/1952 | Cole | 308—72 |
| 3,240,502 | 9/1962 | Snyder. | |

MARTIN P. SCHWADRON, Primary Examiner

L. L. JOHNSON, Assistant Examiner

U.S. Cl. X.R.

287—88; 308—237